United States Patent
Oda

(10) Patent No.: US 9,055,238 B2
(45) Date of Patent: Jun. 9, 2015

(54) RADIATION IMAGE DETECTING DEVICE AND OPERATING METHOD THEREOF

(71) Applicant: FUJIFILM Corporation, Tokyo (JP)

(72) Inventor: Yasufumi Oda, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/228,513

(22) Filed: Mar. 28, 2014

(65) Prior Publication Data

US 2014/0291533 A1 Oct. 2, 2014

(30) Foreign Application Priority Data

Mar. 29, 2013 (JP) ................................. 2013-073590

(51) Int. Cl.
*G01T 1/02* (2006.01)
*H04N 5/32* (2006.01)

(52) U.S. Cl.
CPC ....................................... *H04N 5/32* (2013.01)

(58) Field of Classification Search
CPC ............ A61B 6/032; G01T 1/02; G01T 1/17; G01T 1/16; G01T 1/20; H01L 27/14658
USPC .................................................... 250/370.07
See application file for complete search history.

(56) References Cited

U.S. PATENT DOCUMENTS

| 8,476,597 B2 | 7/2013 | Kuwabara |
| 8,507,871 B2 | 8/2013 | Okada |
| 8,629,406 B2 | 1/2014 | Okada |
| 2011/0180717 A1 | 7/2011 | Okada |
| 2012/0001080 A1* | 1/2012 | Okada .......................... 250/366 |
| 2013/0037699 A1 | 2/2013 | Ihori et al. |

* cited by examiner

*Primary Examiner* — Marcus Taningco
(74) *Attorney, Agent, or Firm* — Birch, Stewart, Kolasch & Birch, LLP

(57) ABSTRACT

To provide a radiation image detecting device providing high responsivity and high precision of an emission start judgment, an electronic cassette has a panel unit and a control unit. The panel unit has a two-dimensional array of normal pixels for accumulating signal charge upon receiving X-rays and detection pixels for detecting the X-rays. A signal processing circuit periodically samples a dose signal, corresponding to an X-ray dose per unit of time, from the detection pixels. An emission start judgment unit performs based on the dose signals of the detection pixels a first judgment process for judging whether X-ray emission has been started, and a second judgment process for judging whether a result of the first judgment process is correct. The control unit sets a second sampling cycle SP2 used in the second judgment process longer than a first sampling cycle SP1 used in the first sampling process.

14 Claims, 10 Drawing Sheets

| BODY PART | TUBE VOLTAGE (kV) | TUBE CURRENT (mA) | EMISSION TIME (s) |
|---|---|---|---|
| ⋮ | ⋮ | ⋮ | ⋮ |
| CHEST | V1 | I1 | T1 |
| ABDOMEN | V2 | I2 | T2 |
| ⋮ | ⋮ | ⋮ | ⋮ |

RADIATION IMAGE DETECTING DEVICE AND OPERATING METHOD THEREOF

BACKGROUND OF THE INVENTION

1. Field of the Invention

The present invention relates to a radiation image detecting device having an emission start judging function that judges a start of radiation emission, and an operating method of the radiation image detecting device.

2. Description Related to the Prior Art

In a medical field, an X-ray imaging system using X-rays, as a kind of radiation, is known. The X-ray imaging system is constituted of an X-ray generating apparatus for generating the X-rays, and an X-ray imaging apparatus for taking an X-ray image of an object (patient) by receiving the X-rays passed through the object. The X-ray generating apparatus includes an X-ray source for emitting the X-rays to the object, a source control unit for controlling the operation of the X-ray source, and an emission switch for commanding the source control unit to start X-ray emission from the X-ray source. The X-ray imaging apparatus includes an X-ray image detecting device for detecting the X-ray image based on the X-rays passed through the object, and a console that controls the operation of the X-ray image detecting device and stores and displays the X-ray image.

The X-ray image detecting device has an image detector e.g. a flat panel detector (FPD) for detecting the X-ray image as an electric signal, and an imaging stand or a portable housing loaded with the FPD. The X-ray image detecting device that has the image detector contained in the portable housing is called an electronic cassette. The image detector has a panel unit having a two dimensional array of pixels each of which accumulates signal charge in response to the X-rays, and a control unit for controlling the operation of the panel unit. This control unit carries out an accumulation operation for accumulating the signal charge in the pixels, and an image readout operation for reading out an image signal corresponding to the signal charge of each pixel on a row-by-row basis of the pixels.

Such an X-ray image detecting device performs synchronization control for synchronization between a start of X-ray emission from the X-ray source and a start of the accumulation operation, so as to carry out the accumulation operation in synchronization with the X-ray emission. The synchronization control can be performed based on a judgment on the start of the X-ray emission from the X-ray source, instead of using a synchronization signal from the X-ray generating apparatus. In this case, the X-ray image detecting device has the function of judging the start of the X-ray emission (refer to US Patent Application Publication No. 2011/0180717 corresponding to Japanese Patent Laid-Open Publication No. 2011-174908, U.S. Pat. Nos. 8,507,871 and 8,629,406 corresponding to Japanese Patent Laid-Open Publication No. 2012-075077, US Patent Application Publication No. 2013/0037699 corresponding to Japanese Patent Laid-Open Publication No. 2011-223508, and U.S. Pat. No. 8,476,597 corresponding to Japanese Patent Laid-Open Publication No. 2012-110565).

The X-ray image detecting device having the emission start judgment function is provided with an X-ray detector for detecting the X-rays, a dose sampling unit for periodically sampling a dose signal that represents an X-ray dose (X-ray intensity) per unit of time based on output of the X-ray detector, and an emission start judgment unit that compares the dose signal with a predetermined threshold value and judges that the X-ray emission has been started when a signal value of the dose signal exceeds the threshold value. The dose sampling unit integrates the output of the X-ray detector in accordance with a sampling cycle and samples the integrated value as the dose signal. According to the US Patent Application Publication No. 2011/0180717 and the U.S. Pat. Nos. 8,507,871, 8,629,406, and 8,476,597, a part of the pixels in the panel unit are used as the X-ray detectors.

The emission start judgment requires high responsivity in order to minimize waste of the X-rays applied to the object. This is because the amount of wasted exposure of the object grows with the amount of time from the start of the X-ray emission to the start of the accumulation operation, since the X-rays applied during that time is not reflected in formation of the X-ray image. Therefore, for the purpose of speedup of the emission start judgment, the US Patent Application Publication No. 2011/0180717 and the U.S. Pat. Nos. 8,507,871 and 8,629,406 propose to set the sampling cycle of the dose signals by the dose sampling unit shorter than a readout period of the image signals of one row. The short sampling cycle shortens sampling intervals of the dose signals, so it is possible to obtain the dose signals early after the X-rays have been actually emitted. As a result, the start of the X-ray emission can be judged quickly.

On the other hand, various types of noise such as stationary noise occurring stationarily and vibration noise caused by shock or vibration from the outside occur in an electric circuit including the dose sampling unit. The noise is applied to the dose signal, and in some cases, brings about a malfunction in the emission start judgment, in such a situation that the dose signal exceeds the threshold value though no X-ray is applied in actual fact. To prevent such a malfunction, the X-ray image detecting devices according to the US Patent Application Publication No. 2013/0037699 and the U.S. Pat. No. 8,476,597 perform the emission start judgment in two steps, that is, a first judgment process and a second judgment process.

Both of the first judgment process and the second judgment process are performed based on the dose signal sampled by the dose sampling unit at the common sampling cycle. In the first judgment process, it is judged whether or not the dose signal is more than the threshold value. In a case where it is judged in the first judgment process that the dose signal is more than the threshold value, the second judgment process is carried out to judge whether or not a result of the first judgment is correct. The second judgment process checks variation in the dose signal with time. If the dose signal keeps having a value more than the threshold value for a predetermined duration, the result of the first judgment is judged to be correct.

As described above, the US Patent Application Publication No. 2013/0037699 and the U.S. Pat. No. 8,476,597 carry out the two-step judgment to improve precision. However, for further improvement of the precision, it is important to make a judgment based on the dose signal having a high S/N. Since the amount of the stationary noise of the dose sampling unit hardly varies with increase or decrease in the X-ray dose, the S/N of the dose signal is increased with increase in the signal value in accordance with the X-ray dose. To increase the signal value, the sampling cycle, which corresponds to a period of integrating the output of the X-ray detector, is preferred to be long. On the other hand, in order to improve the responsivity, the sampling cycle is preferred to be short.

Exposure control of the object tends to become strict more and more in recent years. Considering such circumstances, the X-ray imaging system is on its way to shorten the emission time and lower the X-ray dose per unit of time. In the emission start judgment, the shorter the emission time, the more severely the high responsivity is required. The lower the X-ray dose, the lower the S/N of the dose signal becomes, and hence the more importance it becomes to obtain the high precision than ever before. To meet the needs for the short emission time and the low X-ray dose, both of the high responsivity and the high precision are required.

However, the conventional X-ray image detecting device cannot satisfy the request for both of the high responsivity and the high precision, because improving one of the responsivity and the precision impairs the other.

SUMMARY OF THE INVENTION

An object of the present invention is to provide a radiation image detecting device that can meet the request for both of the high responsivity and the high precision in the emission start judgment, and an operating method of the radiation image detecting device.

To achieve the above and other objects of the present invention, a radiation image detecting device according to the present invention includes a panel unit, a radiation detector, a dose sampling unit, an emission start judgment unit, and a sampling cycle setting unit. The panel unit has a two-dimensional array of pixels each for producing and accumulating signal charge in accordance with radiation emitted from a radiation source. The radiation detector detects the radiation to judge a start of radiation emission. The dose sampling unit periodically samples a dose signal representing a radiation dose per unit of time based on output of the radiation detector. The emission start judgment unit sequentially performs a first judgment process and a second judgment process. The first judgment process judges whether or not the radiation emission has been started based on a level of the dose signal. The second judgment process judges whether or not a result of the first judgment process is correct based on the level of the dose signal sampled by the dose sampling unit. The sampling cycle setting unit sets a sampling cycle of the dose signal in the dose sampling unit. The sampling cycle setting unit sets a second sampling cycle used in the second judgment process longer than a first sampling cycle used in the first judgment process, so that a signal value of the dose signal obtained in one-time sampling in the second judgment process is higher than a signal value of the dose signal obtained in one-time sampling in the first judgment process.

Upon judging that the radiation emission has been started in the first judgment process, the panel unit preferably starts an accumulation operation for accumulating the signal charge in the pixels. In a case where the second judgment process judges that the result of the first judgment process is correct, the panel unit continues the accumulation operation. In a case where the second judgment process judges that the result of the first judgment process is incorrect, the panel unit stops the accumulation operation, and the sampling cycle setting unit sets the sampling cycle at the first sampling cycle, and then the emission start judgment unit restarts the first judgment process.

It is preferable that the sampling cycle setting unit can change at least one of the first sampling cycle and the second sampling cycle.

The radiation image detecting device may have a first mode and a second mode. In the first mode, the first sampling cycle and the second sampling cycle are equal. In the second mode, the second sampling cycle is longer than the first sampling cycle.

The radiation image detecting device preferably includes a mode setting unit for automatically putting the radiation image detecting device into one of the first mode and the second mode in accordance with an imaging condition.

The first judgment process preferably judges that the radiation emission has been started, when the dose signal exceeds a predetermined first threshold value. The second judgment process preferably judges that the result of the first judgment process is correct, when the dose signal exceeds a second threshold value set higher than the first threshold value.

The radiation detector produces electric charge in accordance with the radiation dose. The dose sampling unit preferably has an integrator for integrating the electric charge and outputting a voltage in accordance with an amount of the integrated electric charge. The sampling cycle preferably includes an electric charge integration time for the integrator to integrate the electric charge and a readout time for reading out the voltage outputted from the integrator. The sampling cycle setting unit preferably elongates the second sampling cycle by elongating the electric charge integration time.

The radiation detector is preferably provided in the panel unit. The pixels of the panel unit may include a plurality of normal pixels used for detecting a radiographic image, and a plurality of detection pixels used as the radiation detectors. In the panel unit, signal lines may be laid out on a column-by-column basis of the pixels arranged in two dimensions, and the integrator may be connected to each of the signal lines. The normal pixel may be connected to the signal line through a TFT for reading out the signal charge accumulated during the accumulation operation, and the detection pixel may be connected to the signal line through a TFT in a short state such that the electric charge always flows into the signal line. The integrator may have a capacitor for accumulating the electric charge and a reset switch for shorting out the capacitor, and the reset switch may be turned on and off in synchronization with the sampling. The first sampling cycle is shorter than the readout time of the image signal of one row.

An operating method of the radiation image detecting device includes the steps of setting a first sampling cycle used in the first judgment process by the sampling cycle setting unit; and setting a second sampling cycle used in the second judgment process longer than the first sampling cycle by the sampling cycle setting unit, so that a signal value of the dose signal obtained in one-time sampling in the second judgment process is higher than a signal value of the dose signal obtained in one-time sampling in the first judgment process.

According to the present invention, the second sampling cycle used in the second judgment process is set longer than the first sampling cycle used in the first judgment process. Thereby, it is possible to meet the request for both of the high responsivity and the high precision in the emission start judgment.

BRIEF DESCRIPTION OF DRAWINGS

For more complete understanding of the present invention, and the advantage thereof, reference is now made to the subsequent descriptions taken in conjunction with the accompanying drawings, in which.

DESCRIPTION OF THE PREFERRED EMBODIMENTS

First Embodiment

Figure 1:
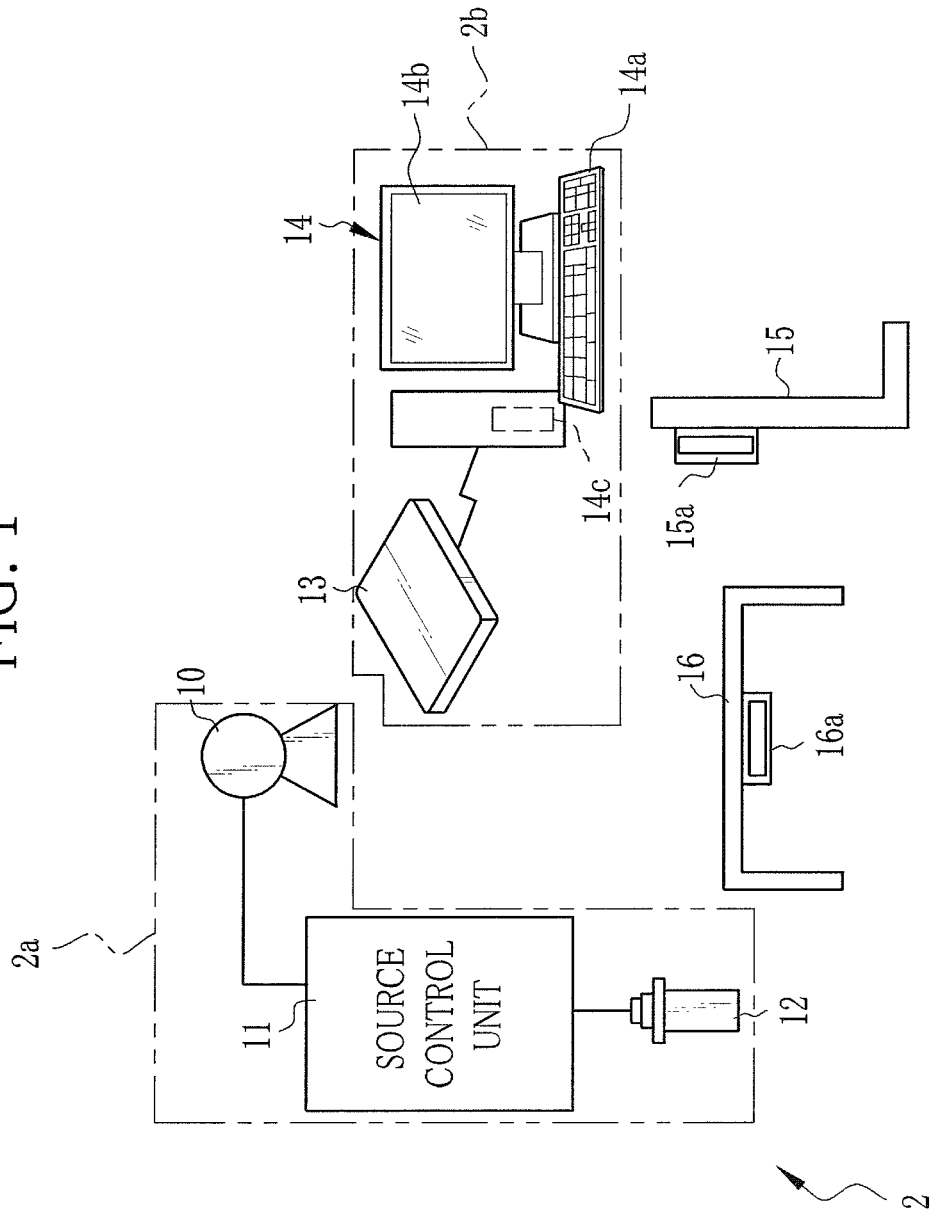
FIG. 1 is a schematic view of an X-ray imaging system.

In FIG. 1, an X-ray imaging system 2 includes an X-ray source 10, a source control unit 11 for controlling the operation of the X-ray source 10, an emission switch 12 for commanding the X-ray source 10 to start warm-up and X-ray emission, an electronic cassette 13 for detecting X-rays passed through an object and outputting an X-ray image, a console 14 that is in charge of operation control of the electronic cassette 13 and a display process of the X-ray image, an imaging stand 15 for imaging the object in a standing position, and an imaging table 16 for imaging the object in a lying position. The X-ray source 10, the source control unit 11, and the emission switch 12 compose an X-ray generating apparatus 2a. The electronic cassette 13 and the console 14 compose an X-ray imaging apparatus 2b. In addition to the above, the X-ray imaging system 2 is provided with a source shift device (not shown) for setting the X-ray source 10 in a desired orientation and position. The X-ray source 10 is shared between the imaging stand 15 and the imaging table 16.

No electric connection is established between the X-ray generating apparatus 2a and the X-ray imaging apparatus 2b, and thus the X-ray imaging apparatus 2b cannot receive a signal indicating a start of the X-ray emission from the X-ray generating apparatus 2a. Therefore, the electronic cassette 13 has the function of making a judgment of a start of the X-ray emission, and thereby it is possible to synchronize the operation of the electronic cassette 13 with the start of the X-ray emission by the X-ray generating apparatus 2a. Also, the X-ray imaging apparatus 2b judges a stop of the X-ray emission based on an X-ray emission time determined in accordance with a body part to be imaged and the like.

The X-ray source 10 has an X-ray tube and an irradiation field limiting device (collimator) for limiting an irradiation field of the X-rays radiating from the X-ray tube. The X-ray tube has a cathode being a filament for emitting thermoelectrons, and an anode (target) that radiates the X-rays by collision of the thermoelectrons emitted from the cathode. In response to a warm-up start command, the filament is preheated and the anode starts rotating. By the completion of the preheat of the filament and the RPM of the anode reaching a predetermined value, an warm-up is completed. The irradiation field limiting device is composed of, for example, four lead plates for blocking the X-rays. The four lead plates are disposed in each side of a rectangle so as to form a rectangular irradiation opening in a middle to pass the X-rays therethrough. Shifting the position of the lead plates varies the size of the irradiation opening to limit the irradiation field.

The console 14 is communicatably connected to the electronic cassette 13 by a wired or wireless method. The console 14 controls the operation of the electronic cassette 13 in response to input of an operator such as a radiological technician from an input device 14a such as a keyboard. An X-ray image from the electronic cassette 13 is displayed on a display 14b of the console 14, and its data is stored to a storage device 14c such as a hard disk or a memory of the console 14, an image storage server connected to the console 14 through a network, or the like.

Upon receiving input of an examination order, the console 14 displays the examination order including information about sex and age of an object, the body part to be imaged, an examination purpose, and the like on the display 14b. The examination order is inputted from an external system e.g. a HIS (hospital information system) or a RIS (radiography information system) that manages object data and examination data related to radiography, or inputted manually by the operator. The examination order includes an item of the body part to be imaged e.g. a head, a chest, an abdomen, a hand, fingers, and the like. The operator confirms the contents of the examination order on the display 14b, and inputs an imaging condition corresponding to the contents through an operation screen on the display 14b.

Figures 2, 3:
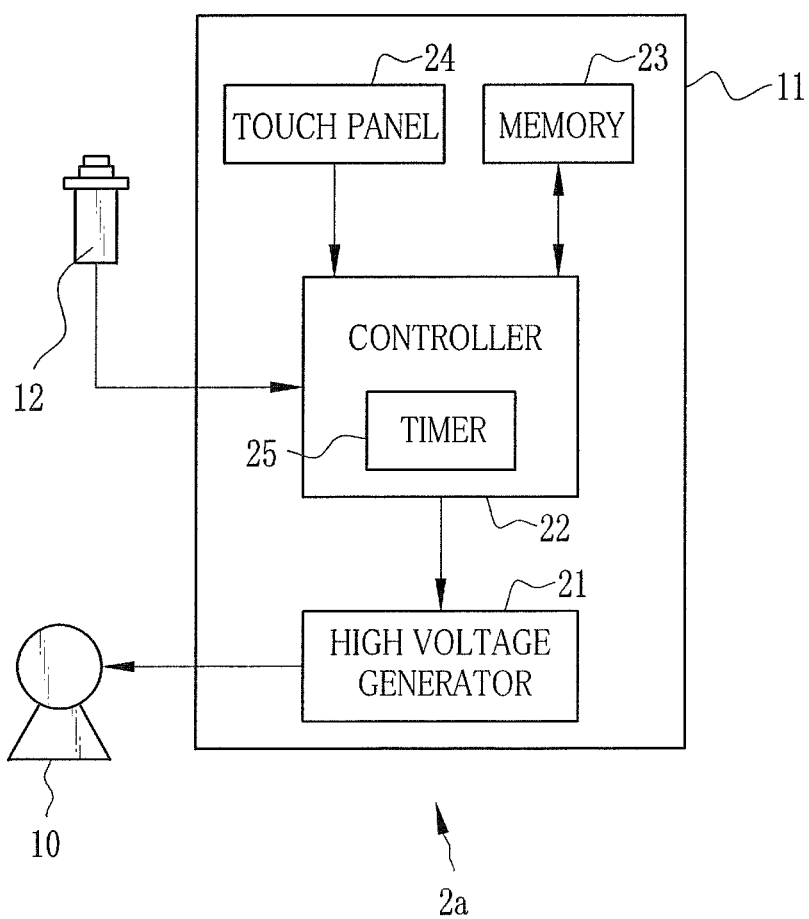
FIG. 2 is a table of imaging conditions.
FIG. 3 is a block diagram of a source control unit.

In FIG. 2, the storage device 14c stores an imaging condition table 20. The imaging condition includes information about the object such as the body part to be imaged, and the sex, the age, and a body thickness of the object, and an X-ray emission condition of the X-ray source 10. The emission condition is determined in consideration of the body part to be imaged and the information about the object. The emission condition includes a tube voltage (in units of kV) for determining an energy spectrum of the X-rays emitted from the X-ray source 10, a tube current (in units of mA) for determining an emission dose per unit of time, and an X-ray emission time (in units of s). This X-ray emission time is used in making a judgment of the stop of the X-ray emission.

The imaging condition table 20 stores the correlation between the body part to be imaged e.g. the chest or the abdomen and the emission condition corresponding to the body part to be imaged. By choosing the body part to be imaged, the emission condition corresponding to the body part is read out. Each value of the emission condition (the tube voltage, the tube current, and the X-ray emission time) read out of the imaging table 20 can be finely adjusted in accordance with the sex, the age, and the body thickness of the object. The tube current and the X-ray emission time are recorded independently in the imaging condition table 20 of this embodiment, but a tube current-time product (a mAs value), being a product of the tube current and the X-ray emission time, may be recorded instead, because a total X-ray emission dose depends on the tube current-time product.

In FIG. 3, the source control unit 11 is provided with a high voltage generator 21 that generates the high tube voltage by multiplying an input voltage using a transformer and supplies the high tube voltage to the X-ray source 10 through a high voltage cable, a controller 22 that controls the tube voltage and the tube current to be applied to the X-ray source 10 and the X-ray emission time, a memory 23, and a touch panel 24.

To the controller 22, the emission switch 12, the high voltage generator 21, the memory 23, and the touch panel 24 are connected. The emission switch 12 is a two-step press switch for inputting commands to the controller 22. Upon a first-step press (half push) of the emission switch 12, the controller 22 issues a warm-up command signal to the high voltage generator 21 to start warming up the X-ray source 10. Upon a second-step press (full push) of the emission switch 12, the controller 22 transmits an emission command signal to the high voltage generator 21 to start the X-ray emission from the X-ray source 10.

The memory 23 stores in advance a plurality of types of imaging conditions each including the emission condition such as the tube voltage, the tube current, and the X-ray emission time, just as with the storage device 14c of the console 14. The imaging condition is set manually by the operator through the touch panel 24. The plurality of types of imaging conditions are read out of the memory 23 and displayed on the touch panel 24. The operator chooses the same imaging condition as the one inputted to the console 14 out of the displayed imaging conditions, and thereby the imaging condition is set in the source control unit 11. As in the case of the console 14, each value of the imaging condition is finely adjustable. The controller 22 contains a timer 25 in order to stop the X-ray emission when the set emission time has elapsed.

Figure 4:
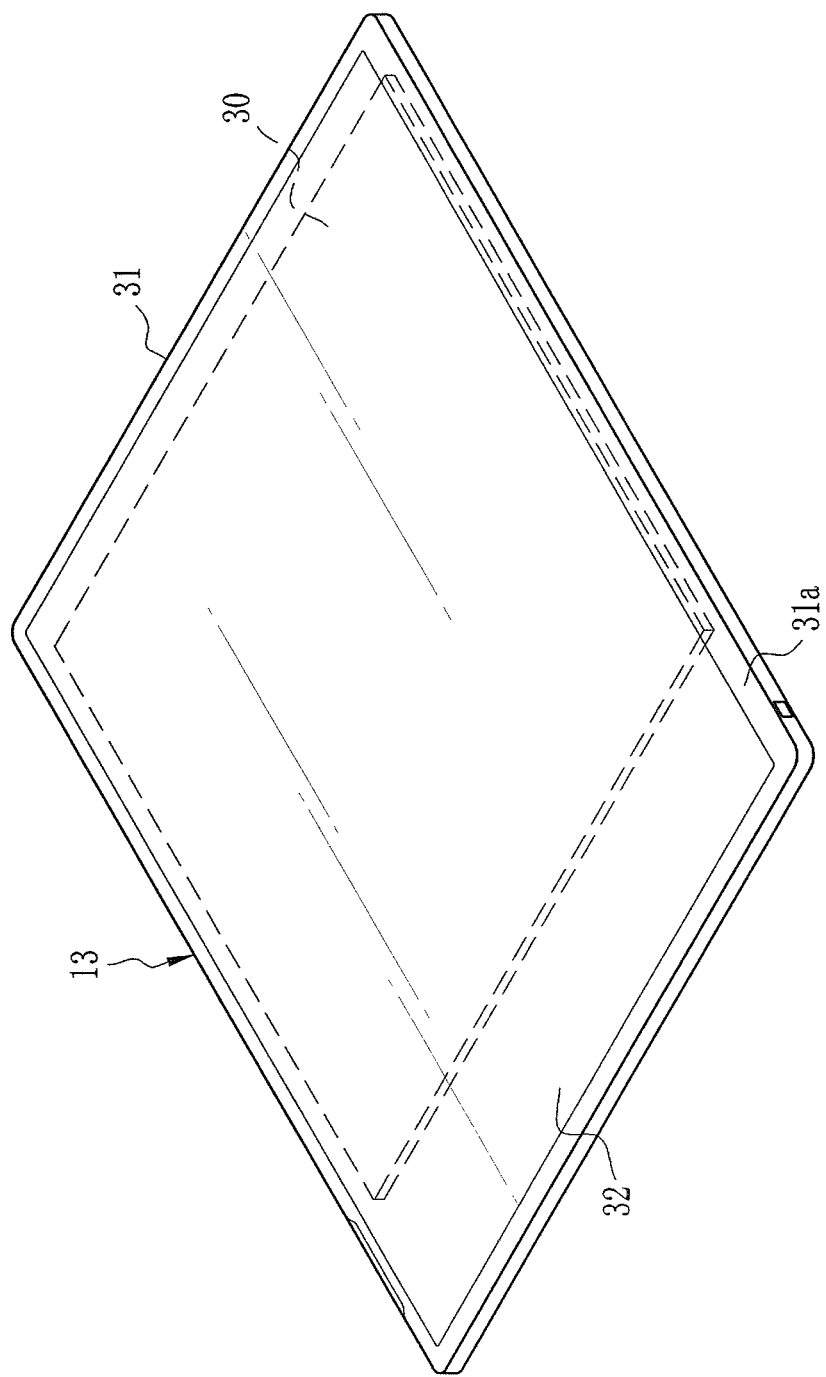
FIG. 4 is a perspective view of an electronic cassette.

In FIG. 4, the electronic cassette 13 is composed of an image detector 30 and a flat box-shaped portable housing 31 containing the image detector 30. The housing 31 is made of a conductive resin, for example. The housing 31 has a rectangular opening at its front surface 31a on which the X-rays are incident. An X-ray transmission plate 32 is fitted into the opening, as a top plate. The X-ray transmission plate 32 is made of a carbon material possessing light weight, high stiffness, and high X-ray transmittance. The housing 31 also functions as an electromagnetic shield, which prevents entry of electromagnetic noise to the electronic cassette 13 and radiation of electromagnetic noise from the electronic cassette 13 to the outside. In addition to the image detector 30, the housing 31 contains a battery (secondary battery) for supplying electric power to drive the electronic cassette 13 and an antenna for establishing wireless communication of data such as the X-ray image with the console 14.

The housing 31 is of a size compatible with International Standard ISO4090:2001, as with a film cassette and an IP cassette. The electronic cassette 13 is detachably loaded into a holder 15a (see FIG. 1) of the imaging stand 15 or a holder 16a (see FIG. 1) of the imaging table 16 in such a position that the front surface 31a of the housing 13 is opposed to the X-ray source 10. The X-ray source 10 is shifted by the source shift mechanism so as to be opposed to one of the imaging stand and the imaging table to be used.

The electronic cassette 13 can be used by itself, instead of being loaded into the imaging stand 15 or the imaging table 16, in a state of being put on a bed under the object lying or held by the object himself/herself. Furthermore, the electronic cassette 13 is approximately of the same size as the film cassette and the IP cassette, and is loadable into an existing imaging stand or table designed for the film cassette and the IP cassette. Note that, the housing 31 may not be of the size compatible with the International Standard ISO4090:2001.

Figure 5:
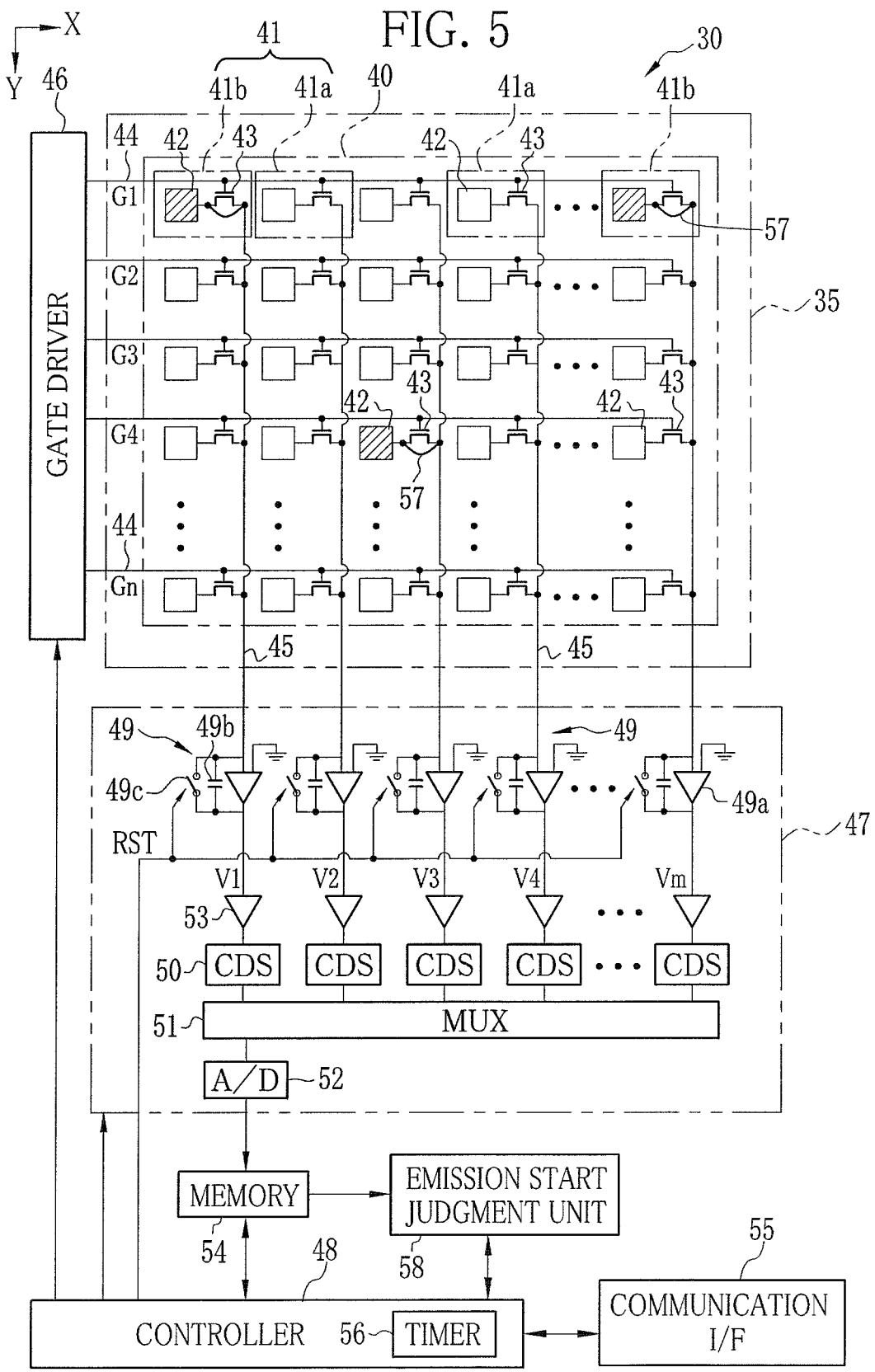
FIG. 5 is a block diagram of an image detector.

In FIG. 5, the image detector 30 is constituted of a panel unit 35 and a control unit for controlling the operation of the panel unit 35. The panel unit 35 has a TFT active matrix substrate and an image capturing field 40 formed in the substrate. In the image capturing field 40, a plurality of pixels 41 each for accumulating electric charge in accordance with an X-ray dose incident thereon are arranged into a matrix of N rows (X direction) by M columns (Y direction) at a predetermined pitch. N and M are integers of 2 or more, and is approximately 2000, for example. Note that, the pixels 41 may not be in a rectangular matrix arrangement, but in a honeycomb arrangement.

The panel unit 35 is of an indirect conversion type, having a scintillator (phosphor, not shown) for converting the X-rays into visible light. The pixels 41 perform photoelectric conversion of the visible light converted by the scintillator. The scintillator is made of CsI:Tl (thallium activated cesium iodide), GOS (Gd2O2S:Tb, terbium activated gadolinium oxysulfide), or the like, and is opposed to the entire image capturing field 40 having the matrix of pixels 41. Note that, the scintillator and the active matrix substrate may be disposed in either a PSS (penetration side sampling) method in which the scintillator and the substrate are disposed in this order from an X-ray incident side, or an ISS (irradiation side sampling) method in which the substrate and the scintillator are disposed in this order, oppositely to the PSS method. Also, a panel unit of a direct conversion type, which has a conversion layer (amorphous selenium or the like) for directly converting the X-rays into the electric charge without using the scintillator, may be used instead.

Scan lines 44 and signal lines 45 are routed into a lattice in the image capturing field 40. One scan line 44 is provided for the pixels 41 of one row, in other words, the number of the scan lines 44 coincides with the number N of the rows of the pixels 41. One signal line 45 is provided for the pixels 41 of one column, in other words, the number of the signal lines 45 coincides with the number M of the columns of the pixels 41.

As is widely known, the pixel 41 is composed of a photoelectric conversion element 42 that produces the electric charge (electron and hole pairs) upon incidence of the visible light and accumulates the electric charge, and a TFT 43 being a switching element. As the pixels 41, there are normal pixels 41a for detecting the X-ray image, and detection pixels 41b for detecting the start of the X-ray emission. The detection pixel 41b functions as an X-ray detector that detects the X-ray dose received by the image capturing field 40. In FIG. 5, the detection pixel 41b are distinguished from the normal pixels 41a by hatching.

The photoelectric conversion element 42 has a semiconducting layer (of PIN (p-intrinsic-n) type, for example) for producing the electric charge, and an upper electrode and a lower electrode disposed on the top and bottom of the semiconducting layer. The lower electrode of the photoelectric conversion element 42 is connected to the TFT 43, and the upper electrode of the photoelectric conversion element 42 is connected to a bias line. There are the same number of bias lines provided as the number (N rows) of the rows of the pixels 41. All the bias lines are coupled to a bus. The bus is connected to a bias power supply. A bias voltage is applied from the bias power supply to the upper electrodes of the photoelectric conversion elements 42 through the bus and the bias lines. Since the application of the bias voltage produces an electric field in the semiconducting layer, the electric charge (electron and hole pairs) produced in the semiconducting layer by the photoelectric conversion is attracted to the upper and lower electrodes, one of which has a positive polarity and the other of which has a negative polarity. Thereby, the electric charge is accumulated in the photoelectric conversion element 42. A gate electrode of the TFT 43 is connected to the scan line 44. A source electrode of the TFT 43 is connected to the signal line 45. A drain electrode of the TFT 43 is connected to the photoelectric conversion element 42.

The control unit for controlling the operation of the panel unit 35 includes a gate driver 46, a signal processing circuit 47, and a controller 48. The controller 48 makes the panel unit 35 perform an X-ray dose sampling operation, a pixel reset operation, an accumulation operation of the signal charge, and a readout operation of the signal charge. The dose sampling operation checks an integrated value of the electric charge of the detection pixel 41b at a predetermined cycle in order to judge the start of the X-ray emission from the X-ray source 10. Since the bias voltage is applied to the semiconducting layer of the photoelectric conversion element 42 during the operation of the panel unit 35, dark charge caused by a dark current occurs before the X-ray emission, while the signal charge in accordance with the X-ray intensity occurs after the X-ray emission. Although the gate driver 46 is stopped in the dose sampling operation, the source electrode and the drain electrode of the TFT 43 of the detection pixel 41b are short out, and thus the electric charge of the detection pixel 41b of each column flows through the signal line 45 into the signal processing circuit 47. In this X-ray dose sampling operation, a reset switch 49c is turned off during integration of an integrator 49. The reset switch 49c is turned on upon completing one sampling.

The normal pixels 41a accumulate the dark charge during the X-ray dose sampling operation. This dark charge becomes a noise component of the signal charge. The pixel reset operation is carried out to discharge the electric charge of the normal pixels 41a through the signal lines 45, immediately after it is judged that the X-ray emission from the X-ray source 10 has been started. In this pixel reset operation, the gate driver 46 inputs a gate pulse to every scan line 44 and turns on every TFT 43. Thus, every normal pixel 41a is read out at a time, and the electric charge of the pixels 41 are taken out and transmitted on a column-by-column basis to the signal processing circuit 47. In the pixel reset operation, since the reset switches 49c of the signal processing circuit 47 are turned on, the electric charge taken out through the signal lines 45 are abandoned. The pixel reset operation is also carried out, immediately before the X-ray dose sampling operation.

Instead of the concurrent reset for resetting every normal pixel 41a at a time, the pixel reset operation may adopt sequential reset by which the scan lines 44 are sequentially turned on. Otherwise, parallel reset may be adopted by which the scan lines 44 are divided into a plurality of groups and the scan lines are sequentially turned on in group blocks so as to reset a plurality of rows at a time.

After the pixel reset operation, the accumulation operation is started. In this accumulation operation, the TFTs 43 are kept in an off state. The X-rays incident on the panel unit 35 are converted into the visible light by the scintillator. The visible light is incident on the pixels 41, and the photoelectric conversion elements 42 of the pixels 41 convert the visible light into the electric charge. Since the TFTs 43 of the normal pixels 41a are turned off, the normal pixels 41a accumulate the signal charge produced by the photoelectric conversion. On the other hand, the electric charge produced in the detection pixels 41b flow through the short TFTs 43 into the signal processing circuit 47.

After the X-ray emission time, which is determined in accordance with the body part to be imaged, has elapsed from the start of the X-ray emission, an exposure is judged to be completed. Immediately after this, the accumulation operation is shifted to the readout operation. In the readout operation, the gate driver 46 sequentially issues the gate pulses G1 to Gn at predetermined intervals. The first gate pulse G1 is inputted to the first scan line 44, so that the TFT 43 of every normal pixel 41a of the activated first row is turned on. Thus, the signal charge of the normal pixels 41a of the first row is read out, and sent through the signal lines 45 to the signal processing circuit 47. After the issue of the gate pulse G1, the gate driver 46 issues the second gate pulse G2. This gate pulse G2 is inputted to the second scan line 44 to readout the normal pixels 41a of the second row. In this manner, the normal pixels 41a are sequentially read out on a row-by-row basis by the gate pulses G1 to Gn from the gate driver 46. The reset switches 49c are turned on whenever the readout of one row is completed.

In the signal processor 47, each signal line 45 is provided with the integrator 49, an amplifier 53, and a CDS circuit (CDS) 50. An output signal of each CDS 50 is chosen by a multiplexer (MUX) 51, and converted into a digital value by an A/D converter (A/D) 52. Each integrator 49 is composed of an operational amplifier 49a, a capacitor 49b connected between input and output terminals of the operational amplifier 49a, and the reset switch 49c. The signal line 45 is connected to one of the input terminals of the operational amplifier 49a. The other input terminal of the operational amplifier 49a is connected to a ground (GND). The integrator 49 integrates the electric charge inputted from the signal line 45. The integrators 49 convert the integrated electric charge into analog voltage signals V1 to Vm, and output the analog voltage signals V1 to Vm.

Each reset switch 49c is turned on in response to a reset signal RST from the controller 48. Turning on the reset switch 49c discharges the capacitor 49b, i.e. resets the integrator 49. The reset switches 49c are turned on and off in synchronization with the sampling in the X-ray sampling operation. The reset switches 49c are turned on in the pixel reset operation. In the readout operation, the reset switches 49c are turned off during reading out the normal pixels 41a of one row, and turned on once immediately before starting the readout of the next row. In the accumulation operation after the X-ray sampling operation, the reset switches 49c are turned on to discharge the electric charge from the detection pixels 41b. Otherwise, the reset switches 49c may be turned on to discharge the capacitors 49b, immediately before the readout operation of the normal pixels 41b after the X-ray emission.

An output terminal of the operational amplifier 49a of each column is connected to the MUX 51 through the amplifier 53 and the CDS 50. An output of the MUX 51 is connected to the A/D 52. The CDS 50 has sample hold circuits, and applies correlation double sampling to the voltage signal of the integrator 49 to remove a reset noise component of the integrator 49, and holds (sample-holds) the voltage signal from the integrator 49 for a predetermined time period in its sample hold circuit. In other words, the CDS 50 sample-holds the signal of the integrator 49 during the reset, and sample-holds the signal of the integrator 49 after the readout. The CDS 50 calculates a difference between the two signals, and outputs the difference as the analog voltage signals V1 to Vm. The MUX 51 sequentially selects one of the CDSs 50 connected in parallel by an electronic switch based on a control signal from a shift resistor (not shown), and inputs the voltage signals V1 to Vm outputted from the selected CDSs 50 in series to the A/D 52. Note that, another amplifier may be connected between the MUX 51 and the A/D 52.

The A/D 52 converts the inputted analog voltage signals V1 to Vm of one row into digital values, and outputs the digital values to a memory 54 contained in the electronic cassette 13. In the image readout operation, the memory 54 stores the digital values of one row with being associated with coordinates of individual pixels 41, as image data of the X-ray image of one row. Thereby, the readout of one row is completed.

As soon as the MUX 51 reads out the voltage signals V1 to Vm of one row from the integrators 49, the controller 48 outputs the reset pulse RST to the integrators 49, and the reset switches 49c are turned on. Thereby, the signal charge of one row accumulated in the capacitors 49b is discharged and the integrators 49 are reset. After the reset of the integrators 49, the reset switches 49c are turned off again and the integrators 49 are ready for the integration. After that, the gate driver 46 outputs the gate pulse of the next row to start reading out the signal charge from the pixels 41 of the next row. By repetition of the above operations, the signal charge is read out from the normal pixels 41a on a row-by-row basis.

After the completion of the readout from every row, image data representing the X-ray image of one frame is recorded to the memory 54. This image data is read out of the memory 54, and subjected to various types of image processes in the controller 48. The processed image data is transmitted to the console 14 through a communication I/F 55. Thereby, the X-ray image of the object is detected.

As described above, the signal processing circuit 47 functions as an image signal readout unit for reading out the image signal from the panel unit 35. In addition, the signal processing circuit 47 also functions as a dose sampling unit that periodically samples the dose signal, which corresponds to the X-ray dose emitted from the X-ray source 10 per unit of time, based on the output of the X-ray detector (the detection pixel 41b) provided in the image capturing field 40, for the purpose of judging the start of the X-ray emission from the X-ray source 10.

The communication I/F 55 is wiredly or wirelessly connected to the console 14 to mediate transmission and reception of information to and from the console 14. The communication I/F 55 sends the information on the imaging condition from the console 14 to the controller 48. The communication I/F 55 also sends the image data of the X-ray image after being subjected to the various types of image processes from the memory 54 via the controller 48 to the console 14.

The controller 48 contains a timer 56. The timer 56 is set at the X-ray emission time of the imaging condition set in the console 14. The timer 56 starts measuring time at the instant when an emission start judgment unit 58 has judged the start of the X-ray emission. When a measured time of the timer 56 has reached the X-ray emission time, the controller 48 judges that the X-ray emission is stopped and shifts from the accumulation operation to the readout operation.

The controller 48 is provided with circuits (not shown) for applying various types of image processes including an offset correction, a sensitivity correction, and a defect correction to the image data of the X-ray image stored in the memory 54. The offset correction circuit subtracts an offset correction image, which is obtained without irradiation with the X-rays in the image readout operation, from the X-ray image on a pixel-by-pixel basis, in order to remove fixed pattern noise caused by an individual difference of the signal processing circuit 47 and an imaging environment. The sensitivity correction circuit, being also called a gain correction circuit, corrects variations in the sensitivity of the photoelectric conversion elements 42, variations in the output properties of the signal processing circuit 47, and the like. The defect correction circuit corrects a pixel value of a defect pixel with the use of a pixel value of a normal pixel nearby by linear interpolation, based on defect pixel information produced before shipping or in a routine checkup. The defect correction circuit also corrects the pixel values of the pixels 41 in a column having the detection pixel 41b in a like manner. Note that, the above various types of image processing circuits may be provided in the console 14.

Figure 6:
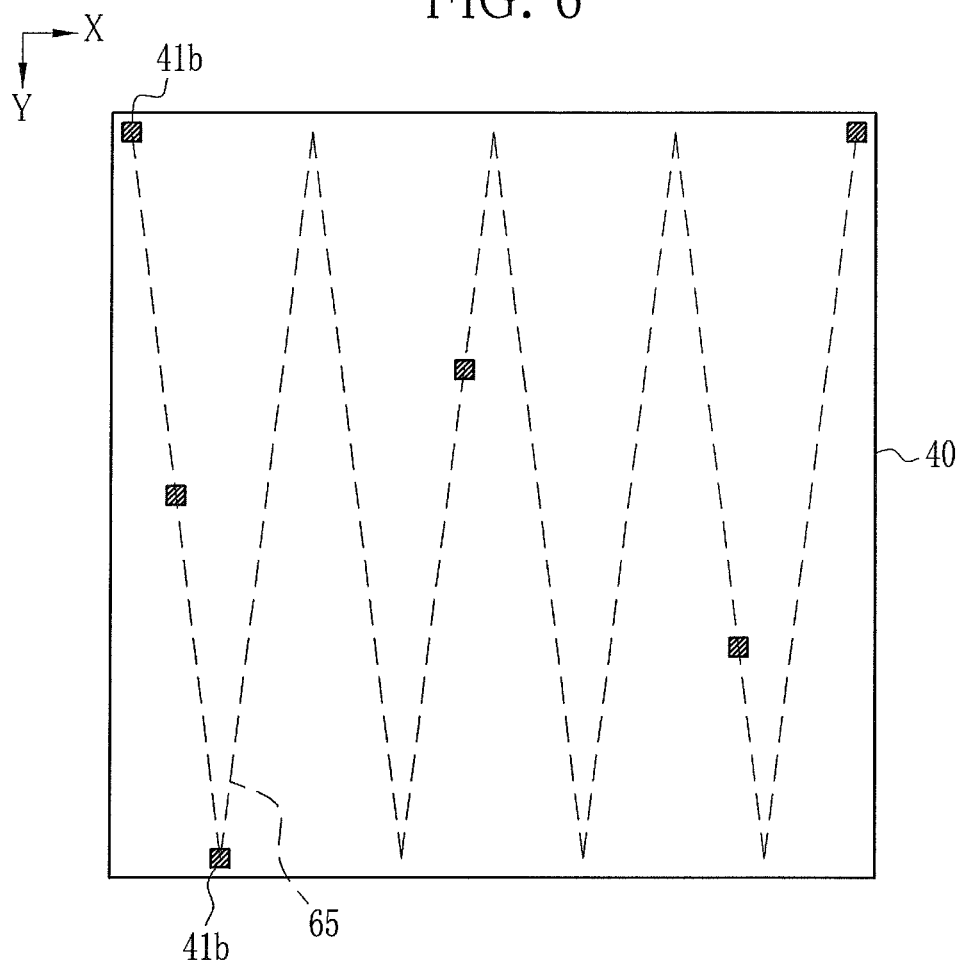
FIG. 6 is an explanatory view showing an example of disposition of detection pixels.

As shown in FIG. 6, for example, the detection pixels 41b are disposed along a waveform line 65 horizontally symmetric with respect to the center of the image capturing field 40, as shown by a dotted line. There is one or a plurality of detection pixels 41b provided in every other signal line 45 or every plural signal lines 45. Note that, at least one detection pixel 41b may be disposed in every signal line 45. The plurality of detection pixels 41b are dispersed over the entire image capturing field 40. Therefore, even if the X-ray irradiation field lies only in a part of the image capturing field 40, any detection pixel 41b can detect the X-rays. The positions of the detection pixels 41b are stores in advance in a nonvolatile memory (not shown), which composes a part of the image detector 30.

In the detection pixel 41b, a short line 57 shorts out the source electrode and the drain electrode of the TFT 43. The other structure of the detection pixel 41b is the same as that of the normal pixel 41a. Thus, the normal pixels 41a and the detection pixels 41b can be manufactured in almost the same manufacturing process. The normal pixel 41a accumulates the electric charge generated in the photoelectric conversion element 42, when the TFT 43 is turned off. In the detection pixel 41b, on the other hand, the electric charge produced in the photoelectric conversion element 42 flows into the signal line 45 irrespective of the turn-on and -off of the TFT 43.

Upon being irradiated with the X-rays, the photoelectric conversion element 42 of the detection pixel 41b produces the electric charge in accordance with the X-ray dose incident on the image capturing field 40. This electric charge flows into the capacitor 49b of the integrator 49 through the signal line 45. Since the reset switch 49c is turned off, this electric charge is accumulated in the capacitor 49b. The signal processing circuit 47 reads out voltages from the integrators 49 in a sampling cycle set by the controller 48, to periodically sample the dose signals corresponding to the electric charge produced in the photoelectric conversion elements 42 of the detection pixels 41b. The electric charge produced in the photoelectric conversion elements 42 of the detection pixels 41b varies in accordance with the X-ray dose incident on the image capturing field 40, so the dose signals obtained in one-time of sampling represent the X-ray dose per unit of time (the sampling cycle). The dose signals are converted into digital values by the A/D 52, and outputted to the memory 54.

Figure 7:
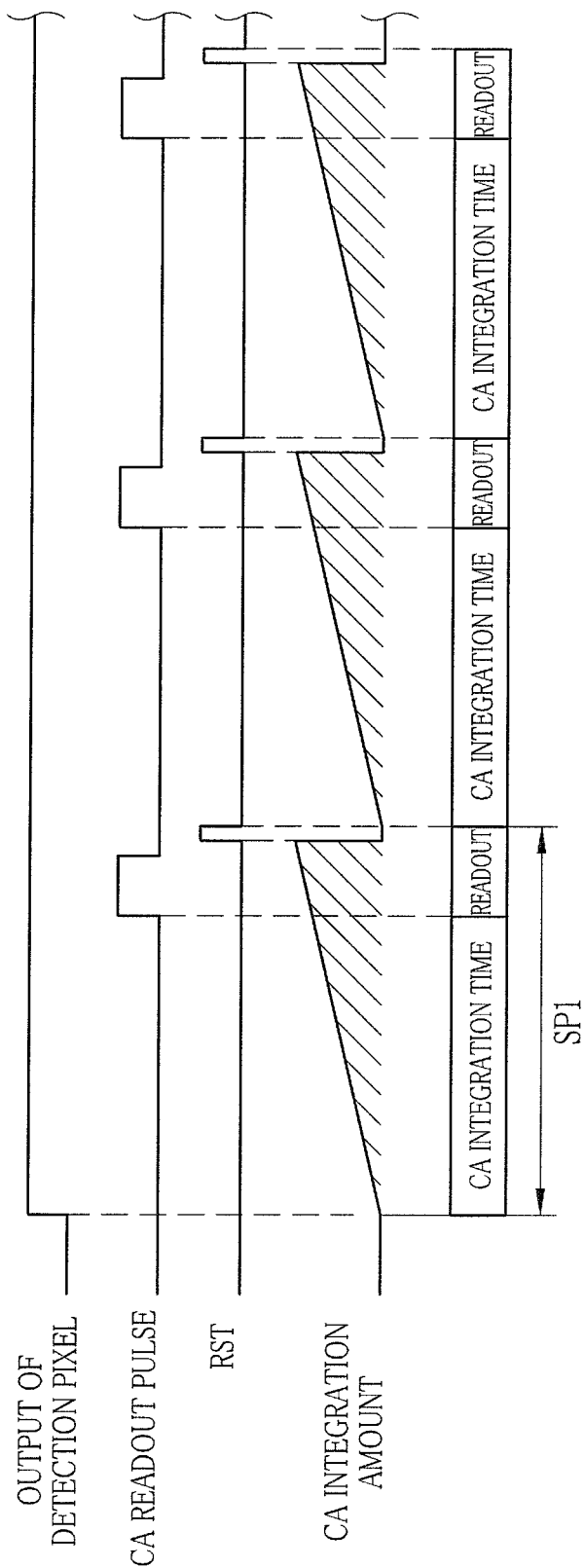
FIG. 7 is a timing chart showing a sampling cycle SP1 of a dose signal.
Figure 8:
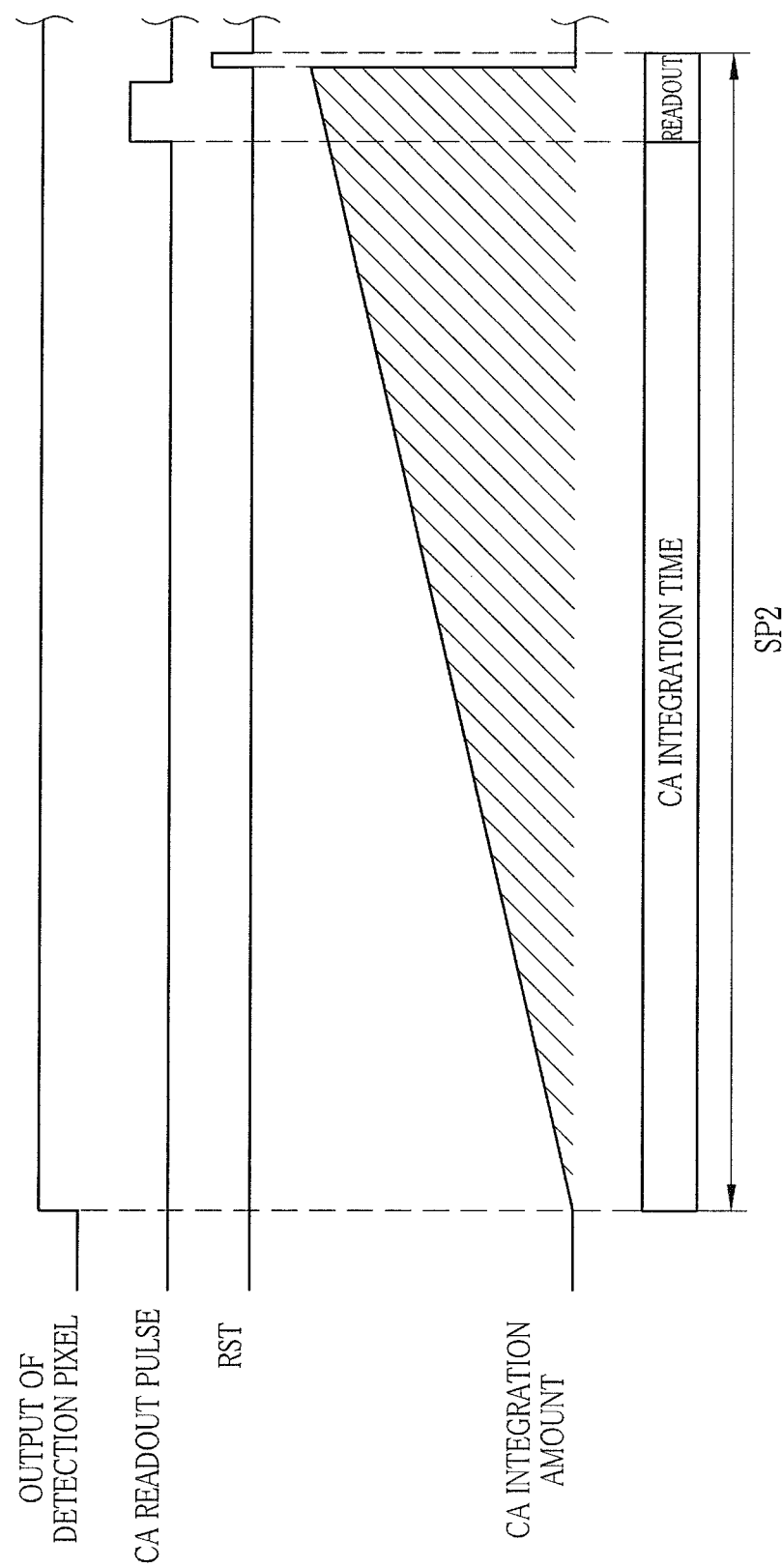
FIG. 8 is a timing chart showing a sampling cycle SP2 of the dose signal.

As shown in FIGS. 7 and 8, a sampling cycle SP of the dose signal is the sum of an electric charge integration time (CA integration time) for the integrator 49 to integrate the electric charge and a readout time (readout) for the dose signal to be read out of the integrator 49 to the memory 54. Since the readout time hardly varies according to increase or decrease in an electric charge integration amount (a CA integration amount) of the integrator 49, varying the sampling cycle SP equates to varying the electric charge integration time of the integrator 49. Thus, the sampling cycle SP is defined by an issue period of CA readout pulses for reading out the dose signal from the integrator 49. The controller 48 controls the issue period of the CA readout pulses to vary the sampling cycle SP.

Provided that the electric charge (a detection pixel output) produced by the photoelectric conversion element 42 of the detection pixel 41b is constant, the CA integration amount (a hatched area in the drawing) of the integrator 49 increases with a lapse of time, so a signal value of the dose signal corresponding to the CA integration amount increases with increase in the sampling cycle SP. Thus, the signal value of the dose signal obtained in one-time sampling is increased with increase in the sampling cycle. In other words, elongating the sampling cycle from SP1 as shown in FIG. 7 to SP2 as shown in FIG. 8 increases the signal value of the dose signal obtained in one-time sampling. The dose signal contains stationary noise that the signal processing circuit 47 occurs stationarily. However, the amount of the stationary noise is almost constant irrespective of the CA integration amount, so the S/N of the dose signal is increased with increase in the signal value of the dose signal.

Whenever one-time sampling is performed, the reset pulse RST is inputted to the integrators 49, and hence the electric charge is discharged from the capacitors 49b and the integrators 49 are reset. After the reset, the integrators 49 restart the integration of the electric charge of the detection pixels 41a on a column-by-column basis. Note that, since the TFT 43 of the normal pixels 41*a* are turned off at this time, the electric charge of the normal pixels 41 does not flow into the signal lines 45.

As shown in FIG. 5, in one-time sampling of the dose sampling operation, the MUX 51 sequentially chooses one of the integrators 49 provided with the signal lines 45 on a column-by-column basis. The chosen dose signals are converted into the digital signals by the A/D 52, and sent to the memory 54. The memory 54 records the dose signals of the detection pixels 41*b* on a column-by-column basis in general.

The emission start judgment unit 58 reads out the dose signal of each column from the memory 54, and judges the start of the X-ray emission based on the read dose signal. The emission start judgment unit 58 firstly performs a dose signal choosing process that chooses one or more dose signals having relatively high signal values, for example, the dose signal having a maximum signal value, as the dose signal to be used for judging the start of the X-ray emission.

As described above, the detection pixel 41*b* is arranged in every plural columns astride the columns having no detection pixel 41*b*, so there are signals of the columns having no detection pixel 41*b* between the dose signals of the columns having the detection pixel 41*b*. The signals of the columns having no detection pixel 41*b* are low-level line noise signals and negligible by choosing the dose signal having the high signal value in the dose signal choosing process.

The amount of the X-rays that are incident upon the image capturing field 40 through the object is uneven in the entire image capturing field 40 due to attenuation by the object. Thus, output of the detection pixels 41*b* differs from place to place, and the signal value of the dose signal of each column differs too. It is conceivable that the dose signal having the high signal value corresponds to the output of the detection pixel 41*b* positioned in an area having a low attenuation by the object, or the output of the detection pixel 41*b* positioned in an area (so-called a directly exposed area) on which the X-rays are incident directly without passing through the object, out of the irradiation field of the X-rays. A dose signal having no effect of attenuation by the object is preferably used in a quick judgment of the start of the X-ray emission. Thus, the emission start judgment unit 58 chooses the dose signal having the high signal value in the dose signal choosing process.

As the dose signal having the high signal value, an average value of a top-ranked plurality of signal values near the maximum may be used, instead of the maximum signal value. Otherwise, an average value or a sum value of all the dose signals may be used. The emission start judgment unit 58 performs the dose signal choosing process whenever sampling the dose signals, and judges the start of the X-ray emission based on the chosen dose signals.

Figure 9:
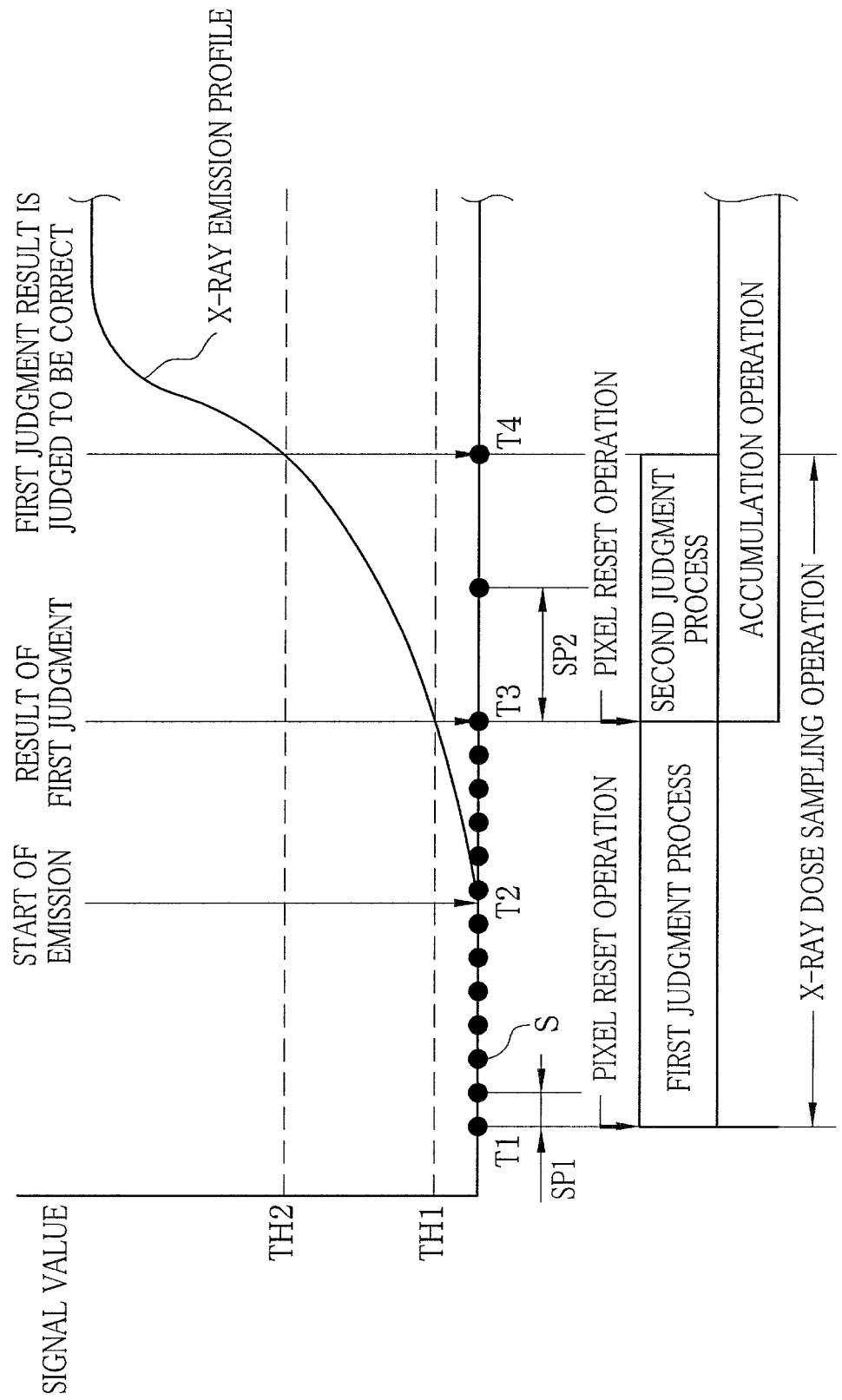
FIG. 9 is an explanatory view showing a state of an emission start judgment in a case where a first judgment result is correct.

As shown in FIG. 9, the emission start judgment unit 58 judges the start of the emission in two steps, including a first judgment process and a second judgment process. The second judgment process judges whether or not a result of the first judgment process is correct, and more specifically, verifies whether the result of the first judgment process is actually based on the dose signal corresponding to the X-ray emission or based on the dose signal having vibration noise or circuit noise.

The controller 48 sets the sampling cycle of the dose signals by the signal processing circuit 47 at a sampling cycle SP1 (a first sampling cycle), as shown in FIG. 7, in the first judgment process, while setting the sampling cycle of the dose signals by the signal processing circuit 47 at a sampling cycle SP2 (a second sampling cycle) longer than the sampling cycle SP1, as shown in FIG. 8, in the second judgment process.

The first judgment process is started at time T1 before the start of the X-ray emission. The time T1 is the timing of setting the imaging condition from the console 14 to the electronic cassette 13, for example. In the first judgment process, the emission start judgment unit 58 compares the dose signal sampled at the sampling cycle SP1 with a predetermined first threshold value TH1. As shown in an X-ray emission profile representing time variation in an X-ray dose (X-ray intensity) emitted from the X-ray source 10 per unit of time, the X-ray dose per unit of time is low immediately after the start of the X-ray emission, and is gradually increased to a set dose value, which is determined according to the tube current. By the start of the X-ray emission, the periodically sampled dose signal is increased corresponding to the X-ray emission profile. Note that, "S" indicates the timing of sampling the dose signals.

In the first judgment process, the relatively short sampling cycle SP1 is set so as to shorten sampling intervals of the dose signals, with the aim of judging the start of the X-ray emission as early as possible after the X-ray emission is actually started.

Note that, the first threshold value TH1 is preferably set as low as possible so that the start of the X-ray emission can be judged in an early stage with the low X-ray dose immediately after the start of the X-ray emission. However, the dose signal contains a line noise component and a noise component corresponding to the dark charge occurring in the detection pixel 41*b*. Thus, if the first threshold value TH1 is set lower than the noise components, the noise components bring about a misjudgment of the first judgment process. Accordingly, the first threshold value TH1 is set at a level that is a little larger than the noise component due to the dark charge.

Upon starting the X-ray emission at time T2, the dose signal is increased with the X-ray emission profile. Upon the dose signal exceeding the first threshold value TH1 (time T3), the emission start judgment unit 58 judges that the X-ray source 10 has started the X-ray emission (the X-rays emitted from the X-ray source 10 have reached the image capturing field 40). The emission start judgment unit 58 outputs to the controller 48 an emission start judgment signal, which represents a first judgment result that judges the start of the X-ray emission, and completes the first judgment process. Upon receiving the emission start judgment signal from the emission start judgment unit 58, the controller 48 resets every normal pixel 41*a* of the panel unit 35 and then starts the accumulation operation. Note that, if every normal pixel 41*a* is reset immediately after each sampling, when the emission start judgment signal is issued, the controller 48 may start the accumulation operation without performing the reset operation.

After the completion of the first judgment process, the emission start judgment unit 58 starts the second judgment process. In the second judgment process, the sampling cycle of the dose signals by the signal processing circuit 47 is set at the relatively long sampling cycle SP2. The emission start judgment unit 58 measures the dose signals of the detection pixels 41*b* on a column-by-column basis at the sampling cycle SP2, and writes the dose signals to the memory 54. The, the emission start judgment unit 58 judges whether or not the first judgment result is correct, based on the dose signals read out of the memory 54. Note that, the electric charge of the detection pixels 41*b* keeps on flowing during the second judgment process, while the accumulation operation is proceeding because the TFTs 43 of the normal pixels 41a are turned off.

To be more specific, the emission start judgment unit 58 compares the dose signal with a second threshold value TH2, which is set higher than the first threshold value TH1, to judge whether or not the dose signal exceeds the second threshold value TH2. In the second judgment process, as in the case of the first judgment process, the dose signal choosing process is performed to determine which dose signal to use out of the dose signals of the plurality of columns obtained in one-time sampling. The chosen dose signal is compared with the second threshold value TH2.

Figure 10:
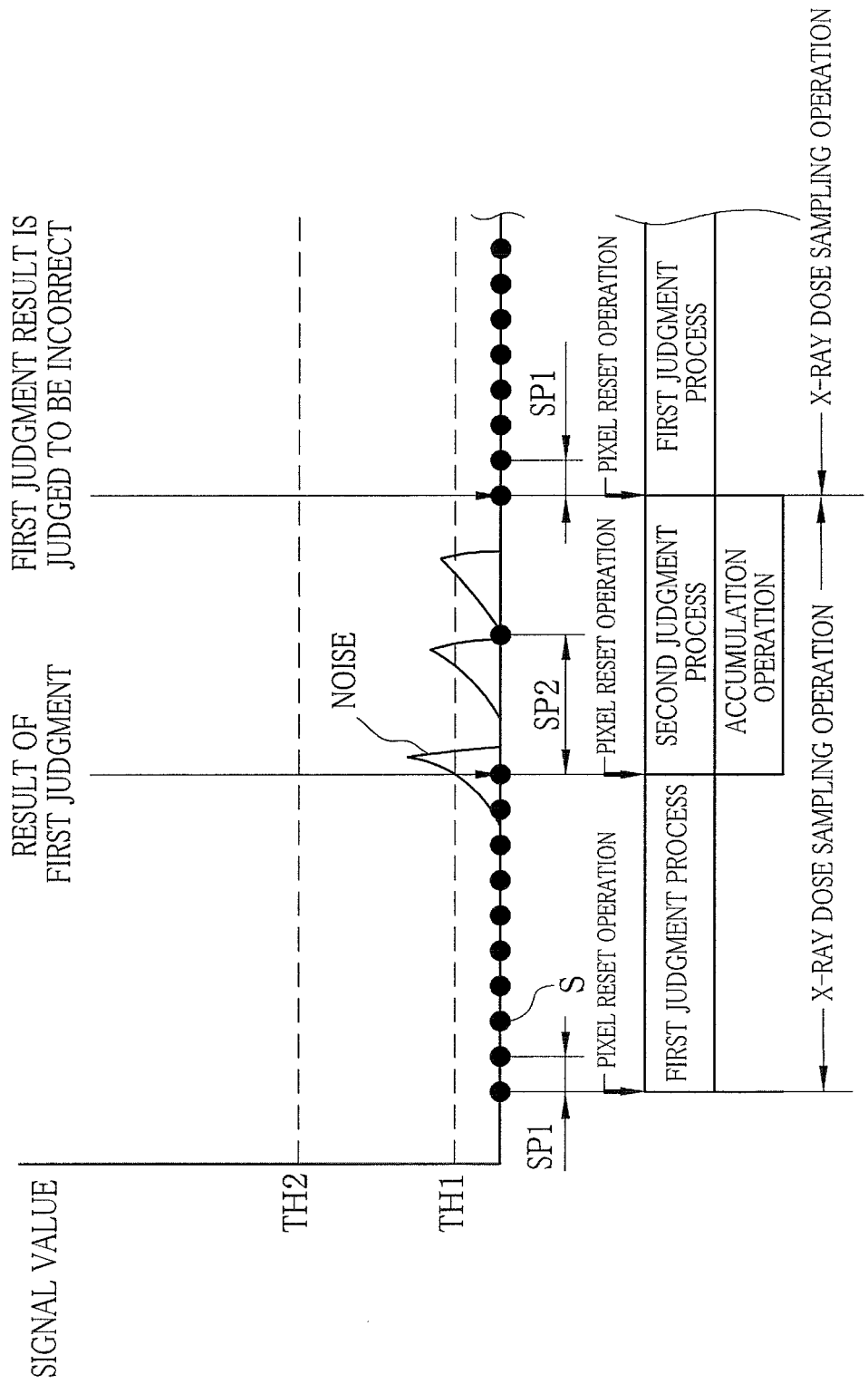
FIG. 10 is an explanatory view showing a state of the emission start judgment in a case where the first judgment result is incorrect.

In a case where the dose signal exceeds the second threshold value TH2, as shown in FIG. 9, the emission start judgment unit 58 judges that the first judgment result, which has judged the start of the X-ray emission, is correct. On the contrary, as shown in FIG. 10, in a case where the dose signal is the second threshold value TH2 or less, there is a possibility that the start of the X-ray emission has been judged mistakenly owing to the dose signal having noise, though the X-rays are not emitted yet in actual fact. The upper limit number (two times in this embodiment) of executing the sampling is determined in the second judgment process, for example. If the dose signal does not exceed the second threshold value TH2 in the two-time sampling, the first judgment result is judged to be incorrect.

In a case where the first judgment result is judged to be correct, the emission start judgment unit 58 outputs a judgment confirmation signal to the controller 48. In a case where the first judgment result is judged to be incorrect, on the other hand, the emission start judgment unit 58 outputs a misjudgment notification signal to the controller 48. In the case of receiving the judgment confirmation signal, the controller 48 continues the accumulation operation of the panel unit 35, as shown in FIG. 9. On the other hand, in the case of receiving the misjudgment notification signal, the controller 48 interrupts the accumulation operation, and restarts the first judgment process, as shown in FIG. 10.

As described above, the second judgment process aims at verifying whether the first judgment result is based on the dose signal that represents the actual X-ray emission or a misjudgment owing to the noise. As shown in FIG. 10, if the first judgment result is based on the dose signal that represents only the noise, the dose signal sampled afterward in the second judgment process is not increased as shown in FIG. 9, but attenuated in the case of the vibration noise. For this reason, the second threshold value TH2 is set at such a level that the dose signal caused only by the noise cannot exceed.

Since the sampling cycle SP2 of the dose signals in the second judgment process is longer than the sampling cycle SP1 of the dose signals in the first judgment process, the S/N of the dose signals obtained in one-time sampling is higher in the second judgment process than in the first judgment process. Therefore, the second judgment process can be performed more precisely than the first judgment process.

Note that, the sampling cycle SP2 of the second judgment process is approximately three times longer than the sampling cycle SP1 of the first judgment process in FIGS. 7 to 10. However, the length of the sampling cycle SP2 is not limited to three times, as long as a relation of SP2>SP1 holds true.

As a preferable example of the sampling cycles SP1 and SP2, the sampling cycle SP2 is fifty times longer than the sampling cycle SP1. More specifically, the sampling cycle SP1 of the first judgment process is 240 μs (=a CA integration time of 180 μs+a readout time of 60 μs) and the sampling cycle SP2 is 12 ms (=a CA integration time of 11940 μs+a readout time of 60 μs).

In the case of setting the sampling cycles SP1 and SP2 at the above values, the CA integration amount of one-time sampling in the second judgment process is approximately 66 (11940/180) times larger than that in the first judgment process, and hence a signal component of the dose signal becomes larger thereby.

If the second judgment process is performed using the sampling cycle SP1 of the first judgment process, obtaining a dose signal that is equivalent to the dose signal obtained using the sampling cycle SP2 in one-time sampling in the second judgment process requires the 66 sampling operations with the sampling cycle SP1 and adds dose signals of the 66 sampling operations. In this case, the stationary noise occurring in each sampling is approximately 8.12 ($66^{1/2}$) times larger than the stationary noise occurring in one-time sampling using the sampling cycle SP2 in the second judgment process, and hence the noise component of the dose signal is increased and the S/N is decreased. Thus, to obtain the dose signal having the higher S/N, performing one-time sampling using the long sampling cycle SP2 is more preferable than performing plural-time sampling using the short sampling cycle SP1 and adding obtained dose signals. Calculating in the above example, performing one-time sampling with the sampling cycle SP2 improves the S/N by 540 (66×8.12) times, as compared with the case of performing 66 sampling operations with the sampling cycle SP1 and adding the dose signals obtained thereby. Furthermore, each sampling cycle SP includes the readout time, so time required for performing one-time sampling with the sampling cycle SP2 is less than time required for performing 66 sampling with the sampling cycle SP1 (SP1 of 240 μm×66=15840 μm>SP2 of 12000 μm (=12 ms)).

Note that, out of the sampling cycles SP1 and SP2, at least the sampling cycle SP1 is preferably set shorter than time (issue intervals of the gate pulses) required for reading out the image signals of one row in the image readout operation, because of placing more importance on responsivity. For example, SP1=½ H, in a case where H represents the issue intervals of the gate pulses.

Next, the operation of the above structure will be described with referring to a flowchart of FIG. 11. First, the object is set in an imaging position in the imaging stand 15 or the imaging table 16. Then, the height and the horizontal position of the electronic cassette 13 are adjusted in accordance with the body part to be imaged and the position of the object. The height and the horizontal position of the X-ray source 10 and the size of the irradiation field are adjusted in accordance with the position of the electronic cassette 13 and the size of the body part to be imaged. Then, the imaging condition is set in the source control unit 11 and the console 14. The imaging condition set in the console 14 is transmitted to the electronic cassette 13.

After making preparation for imaging, the operator half presses the emission switch 12. Upon the half press of the emission switch 12, the warm-up command signal is issued to start warming up the X-ray source 10.

Figure 11:
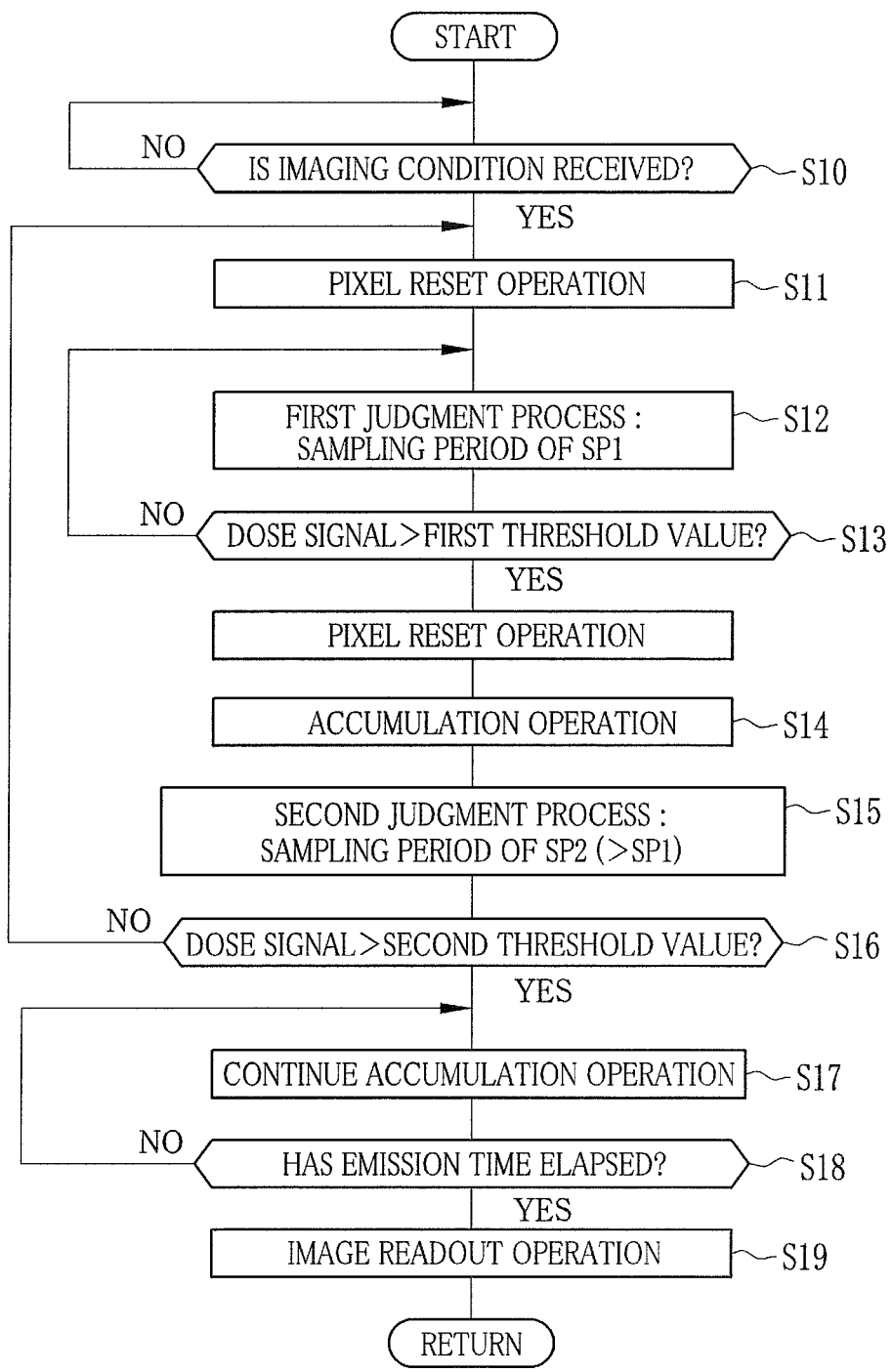
FIG. 11 is a flowchart of the operation of the image detector.

As shown in FIG. 11, in response to receiving the imaging condition from the console 14 (YES in S10), the controller 48 turns on the TFT 43 of every normal pixel 41a once, so that the panel unit 35 starts the pixel reset operation for discharging the dark charge from the normal pixels 41a (S11). At the same time, the reset switches 49c are turned on once, to discharge the capacitors 49b.

After the pixel reset operation, the controller 48 makes the signal processing circuit 47 start the dose sampling operation with the sampling cycle SP1 in a state of stopping the gate driver 46. The emission start judgment unit 58 performs the first judgment process based on the periodically sampled dose signals (S12).

In the first judgment process, the emission start judgment unit 58 compares the dose signal of the detection pixel 41b with the first threshold value TH1 to judge whether or not the dose signal exceeds the first threshold value TH1 (S13). The dose signal has the noise component caused by the dark charge, but the first threshold value TH1 is set higher than the noise component of the dark charge, so the noise component owing to the dark charge does not cause a misjudgment in the first judgment process.

Upon the full press of the emission switch 12 by the operator, the X-ray source 10 starts emitting the X-rays. The start of the X-ray emission increases the signal value of the dose signal of the detection pixel 41b, as shown in FIG. 9, to the extent of exceeding the first threshold value TH1. When the dose signal exceeds the first threshold value TH1, the emission start judgment unit 58 judges that the X-ray emission has been started (YES in S13). The emission start judgment unit 58 outputs the emission start signal to the controller 48, and completes the first judgment process.

Upon receiving the emission start signal, the controller 48 turns on the TFT 43 of every normal pixel 41a once via the gate driver 46 to perform the pixel reset operation, and then turns off the TFT 43 to make the panel unit 35 start the accumulation operation (S14). Accordingly, the timing of starting the X-ray emission is synchronized with the timing of starting the accumulation operation. The controller 48 starts measuring the emission time using the timer 56, in synchronization with the start of the accumulation operation.

In the first judgment process, since the sampling cycle of the dose signal is set at the relatively short sampling cycle SP1, the sampling intervals of the dose signal are short. Thus, it is possible for the emission start judgment unit 58 to judge the start of the X-ray emission early after the actual start of the X-ray emission, and obtain high responsivity. Also, the accumulation operation is started immediately after the judgment of the start of the X-ray emission in the first judgment process, so the applied X-ray dose is less wasted.

Upon receiving the emission start signal, the controller 48 makes the signal processing circuit 47 start the dose sampling operation with the sampling cycle SP2. The emission start judgment unit 58 performs the second judgment process based on the dose signal of the detection pixel 41b sampled in the sampling cycle SP2 (S15).

In the first judgment process, the dose signal of the detection pixel 41b contains no signal component of the X-rays, while no X-ray is emitted from the X-ray source 10. However, as shown in FIG. 10, if the dose signal has the stationary noise occurring in the signal processing circuit 47 or the vibration noise caused by shock or vibration applied to the electronic cassette 13, the noise increases the signal value of the dose signal to the extent of exceeding the first threshold value TH1. If the dose signal having the noise exceeds the first threshold value TH1, the emission start judgment unit 58 outputs the emission start signal to the controller 48, as in the case of the actual start of the X-ray emission, and outputs the emission start signal to the controller 48. The panel unit 35 starts the accumulation operation of the normal pixels 41a.

In the second judgment process, the emission start judgment unit 58 compares the dose signal of the detection pixel 41b sampled in the sampling cycle SP2 with the second threshold value TH2 (S16).

Since the sampling period SP2 is longer than the sampling cycle SP1, it is possible to obtain the dose signal having a higher S/N than in the first judgment process and improve the precision of the second judgment process. Even if the X-ray dose is extremely low, an adequate level of the dose signal can be obtained in the second judgment process. Therefore, the start of the emission can be judged with high precision even in low dose radiography.

As shown in FIG. 9, in a case where the dose signal of the detection pixel 41b exceeds the second threshold value TH2 and the first judgment result is judged to be correct in the second judgment process (YES in S16), the emission start judgment unit 58 outputs the judgment confirmation signal to the controller 48. In this case, the panel unit 35 continues the accumulation operation of the normal pixels 41a (S17). In the accumulation operation after the second judgment process, the reset switches 49c are turned on in order to discharge the electric charge of the detection pixels 41b.

When a time measured by the timer 25 has reached the emission time, the X-ray generating apparatus 2a stops the X-ray emission from the X-ray source 10.

When a time measured by the timer 56 has reached the emission time set in the imaging condition (YES in S18), the X-ray emission is presumed to be stopped. The accumulation operation is completed, and the panel unit 35 starts the image readout operation (S19). After the completion of the image readout operation, the panel unit 35 returns to the X-ray dose sampling operation.

In a case where the first judgment result is judged to be incorrect in the second judgment process (NO in S16), as shown in FIG. 10, the emission start judgment unit 58 outputs the misjudgment notification signal to the controller 48. Upon receiving the misjudgment notification signal, the controller 48 makes the panel unit 35 interrupt the accumulation operation. The controller 48 performs the pixel reset operation, and makes the signal processing circuit 47 restart the dose sampling operation using the sampling cycle SP1. The controller 48 also makes the emission start judgment unit 58 restart the first judgment process.

In performing the image readout operation from the electronic cassette 13, the X-ray image is recorded to the memory 54. The controller 48 applies various types of image processes to the X-ray image stored in the memory 54. The processed X-ray image is transmitted to the console 14 through the communication I/F 55, and displayed on the display 14b for use in a diagnosis.

According to the present invention, the start of the X-ray emission is judged in two steps including the first judgment process and the second judgment process, and the sampling cycle SP2 of the dose signal in the second judgment process is set longer than the sampling cycle SP1 of the dose signal in the first judgment process. Thus, the sampling intervals of the dose signal are short in the first judgment process. This makes it possible to judge the start of the X-ray emission early after the actual start of the X-ray emission, and obtain high responsivity. On the other hand, in the second judgment process, it is possible to obtain the dose signal having a high S/N and perform the judgment with high precision. Therefore, both of the responsivity and the precision can be obtained. The shorter the emission time, the more responsivity is required. The lower the X-ray dose, the higher precision is required. For this reason, the present invention is especially effective in short time radiography having short emission time and low dose radiography using a low X-ray dose.

US Patent Application Publication No. 2011/0180717 and U.S. Pat. Nos. 8,507,871 and 8,629,406 disclose a technique for making the sampling cycle shorter than the readout period of the image signals of one row. US Patent Application Publication No. 2013/0037699 and U.S. Pat. No. 8,476,597 disclose a technique for judging the start of the emission in two steps of the first judgment process and the second judgment process. If these techniques are simply combined, the sampling cycle of the dose signal is shortened in both of the first judgment process and the second judgment process. However, as described above, the S/N of the dose signal becomes higher in performing one-time sampling with the long sampling cycle than that in performing plural-time sampling with the short sampling cycle and adding the obtained dose signals. Accordingly, the present invention can obtain more advantageous effect than a combination of the prior arts, that is, further improvement in the precision of the second judgment process.

The vibration noise caused by the shock or vibration applied to the electronic cassette 13 attenuates and disappears with a lapse of time. Thus, the vibration noise is added to the dose signal that is read out of the integrator 49 and outputted to the memory 54 by a lower probability in the case of performing one-time sampling with the long sampling cycle than in the case of performing plural-time sampling with the short sampling cycles and adding the obtained dose signals. As a result, it is possible to perform the second judgment process with higher precision.

This embodiment makes a judgment of only the start of the X-ray emission, and the timing of the completion of the X-ray emission is judged by the measured time by the timer 56. However, the stop of the X-ray emission may be judged based on the dose signals. In this case, the dose sampling operation is continued using the detection pixels 41a even after the first judgment result is judged to be correct in the second judgment process. In this case, the emission start judgment unit 58 is used as an emission start and stop judgment unit, and judges the stop of the X-ray emission when the dose signal comes to be a predetermined stop threshold value or less.

In the above embodiment, the signal processing circuit 47 functions as the dose sampling unit and the image signal readout unit, and hence facilitates cost reduction. However, other signal processing circuits that function as the dose sampling unit and the image signal readout unit may be provided separately. In this case, as described in the US Patent Application Publication No. 2011/0180717, wiring dedicated to dose signal readout is provided other than the signal lines 45 for image signal readout, and the dedicated wiring connects the detection pixels to the dose sampling unit provided separately from the signal processing circuit.

Judging conditions of the first judgment process and the second judgment process may be different from those described in the above embodiment. For example, the start of the X-ray emission may be judged or the first judgment result may be judged to be correct, in a case where the dose signal keeps exceeding the first threshold value TH1 or the second threshold value TH2 for predetermined time (all the dose signals obtained in continuous sampling of a predetermined number of times exceed the first threshold value TH1 or the second threshold value TH2). However, the first judgment process requires high responsivity, so the start of the X-ray emission is preferably judged in a case where the dose signal exceeds the first threshold value even just one time, as described in the above embodiment.

The second judgment process may be performed by comparing the signal values of the dose signals obtained in two-time continuous sampling. More preferably, in a case where the signal value of the latter dose signal is higher than that of the former dose signal, the first judgment result is judged to be correct. In the opposite case, the first judgment result is judged to be incorrect.

Furthermore, as described in the U.S. Pat. No. 8,476,597, the second judgment process may be performed by a comparison between a threshold value and a value that a waveform representing variation of the dose signal with time obtained in plural-time sampling is differentiated with respect to time. The waveform of the dose signal in the case of the actual X-ray emission can be distinguished from the waveform of the dose signal with noise by differentiation with time, so setting the threshold value within an appropriate range allows performance of the second judgment process.

Second Embodiment

In the above first embodiment, the sampling cycle SP1 and the sampling cycle SP2 are fixed values, and the sampling cycle is switched between the two fixed values. Each of the sampling cycles SP1 and SP2 may be freely variable. The operator can change the sampling cycles manually from the console 14, for example, via the controller 48 functioning as a sampling cycle setting unit. In performing radiography using a relatively large X-ray dose, the sampling period SP1 may be elongated with maintaining a relation of SP1<SP2, to place more importance on the precision than the responsivity. In performing radiography using an extremely low X-ray dose, the sampling cycle SP1 may be set lower than its initial value, and the sampling cycle SP2 may be set higher than its initial value. The sampling cycles can be set at appropriate values in accordance with the imaging condition. The imaging condition includes the body part to be imaged, the body thickness of the object, and the like in addition to the emission condition, which determines the amount of the X-ray emission from the X-ray source 10. Depending on the body part and the body thickness of the object, the sampling cycles SP1 and SP2 are adjustable to appropriate values.

Third Embodiment

In the above first embodiment, the sampling cycle SP2 is always set longer than the sampling cycle SP1. However, a first mode in which the same sampling cycles SP1 and SP2 are set equal and a second mode in which the sampling cycle SP2 is set longer than the sampling cycle SP1 may be provided. In this case, mode selection is performed manually from the console 14, for example. Each mode is selected in accordance with the imaging condition.

The mode selection may be automatically performed in accordance with the chosen imaging condition. In this case, the controller 48 functions as a mode setting unit. To be more specific, a table of correlation between the imaging conditions and the modes is stored in advance in the internal memory of the controller 48. The controller 48 looks up the mode that meets the imaging condition received from the console 14 in the table, and adopts the mode.

For example, the second mode is adopted in such an imaging condition that the X-ray dose reaching the image capturing field 40 is extremely low and a level of the dose signal is likely to be lower than a standard, e.g. in a case where the tube current is low and the X-ray dose is relatively low, a case where the body thickness of the object is thick, or a case where the body part to be imaged is a relatively thick body part. The first mode is adopted in the other cases. In the first mode, the second judgment process is performed relatively quickly because the sampling cycle SP2 is equal to the sampling cycle SP1. In a case where the first judgment result is judged to be incorrect in the second judgment process, the first judgment process is restarted quickly.

In the above first embodiment, the detection pixel 41b has the short line 57 for shorting out the source electrode and the drain electrode of the TFT 43. However, as the detection pixel 41b, a pixel that has no TFT 43 and has the photoelectric conversion element 42 directly connected to the signal line 45 may be used, for example. Otherwise, the detection pixel 41b may have two TFTs to be functioned as a normal pixel. In this case, one of the TFTs is connected to the scan line 44 and functions as a TFT for image readout, just as with the TFT 43 of the first embodiment. The other TFT is connected to a scan line dedicated to dose signal readout, other than the scan line 44. A gate driver dedicated to dose signal readout may be provided to independently control the two TFTs, and the TFT dedicated to dose signal readout is connected to this gate driver through the scan line dedicated to dose signal readout. The gate driver dedicated to dose signal readout turns on the TFT dedicated to dose signal readout in the dose sampling operation, and turns off the TFT dedicated to dose signal readout after the judgment of the start of the emission. Thus, the detection pixel 41b can perform the accumulation operation as with the normal pixel 41a, and hence the detection pixel 41b can be used as the normal pixel 41a. Note that, with the use of one TFT, the scan lines of the two types of gate drivers may be connected to the same gate.

Note that, the disposition of the detection pixels as shown in FIG. 6 is just an example. For example, the detection pixels may be arranged in X and Y directions at a predetermined pitch over the entire image capturing field 40 into a lattice. The detection pixel is the size of one normal pixel, but a part of the photoelectric conversion element of one pixel may be separated as a sub pixel to be used as the detection pixel. Otherwise, a dedicated detection pixel may be disposed between the two normal pixels.

The X-ray detector for judging the start of the emission may not be the detection pixel. For example, the panel unit may be composed of only the normal pixels. In the first judgment process, all the TFTs are turned on so that the electric charge produced in every pixel flows into the integrators through the signal lines, and the dose signals are sampled based on output of every pixel. In the second judgment process, every TFT is turned off, and the dose signals are sampled based on leak current leaking from the pixels. In this case, all the pixels function as the X-ray detectors. Even while the TFT is turned off, a little amount of electric charge leaks from the pixel 41 to the signal line 45 as the leak current. The leak current is increased with increase in the amount of electric charge accumulated in the pixel 41, so that leak current can be used as the dose signal. In the case of using the leak current, as described above, the signal value of the dose signal becomes low, so the present invention that aims at improving the S/N of the dose signal by setting the long sampling cycle SP2 is effective.

With taking advantage of the fact that electric current flowing through the bias line, which applies the bias voltage, is in proportional to the electric charge produced in the pixel, the X-ray dose may be detected based on the electric current flowing through the bias line connected to an arbitrary pixel. In this case, an electric current detector for detecting the electric current of the bias line functions as the X-ray detector. The dose sampling unit obtains the dose signal by integration of the electric current detected by the electric current detector.

The X-ray detector may be provided around the image capturing field. Otherwise, the X-ray detector that is completely independent of the panel unit may be provided in the housing of the electronic cassette, or attached to the periphery of the housing.

The image detector of a TFT type is described in the above embodiments, but an image detector of a CMOS (complementary metal oxide semiconductor) type may be used instead. The CMOS type can perform a so-called nondestructive readout by which signal charge accumulated in each pixel is read out as a voltage signal through an amplifier provided in the pixel without flowing out to a signal line. Accordingly, it is possible to choose an arbitrary pixel in the image capturing field and read out the dose signal from the pixel. In the case of the CMOS type, every pixel can be functioned as the X-ray detector.

In addition to the electronic cassette and the console, an imaging control device, which performs a part of an electronic cassette control function of the console, may be connected between the electronic cassette and the console.

The present invention may be applied to the X-ray image detecting device loaded in the imaging stand or table, instead of or in addition to the electronic cassette being the portable X-ray image detecting device. Furthermore, the present invention is applicable to a device using another type of radiation such as γ-rays, instead of the X-rays.

Although the present invention has been fully described by the way of the preferred embodiment thereof with reference to the accompanying drawings, various changes and modifications will be apparent to those having skill in this field. Therefore, unless otherwise these changes and modifications depart from the scope of the present invention, they should be construed as included therein.

What is claimed is:

1. A radiation image detecting device comprising:
   a panel unit having a two-dimensional array of pixels each for producing and accumulating signal charge in accordance with radiation emitted from a radiation source;
   a radiation detector for detecting said radiation to judge a start of radiation emission;
   a dose sampling unit for periodically sampling a dose signal representing a radiation dose per unit of time based on output of said radiation detector;
   an emission start judgment unit for sequentially performing a first judgment process and a second judgment process, said first judgment process judging whether or not said radiation emission has been started based on a level of said dose signal, said second judgment process judging whether or not a result of said first judgment process is correct based on said level of said dose signal sampled by said dose sampling unit; and
   a sampling cycle setting unit for setting a sampling cycle of said dose signal in said dose sampling unit, said sampling cycle setting unit setting a second sampling cycle used in said second judgment process longer than a first sampling cycle used in said first judgment process, so that a signal value of said dose signal obtained in one-time sampling in said second judgment process is higher than a signal value of said dose signal obtained in one-time sampling in said first judgment process.

2. The radiation image detecting device according to claim 1, wherein
   upon judging that said radiation emission has been started in said first judgment process, said panel unit starts an accumulation operation for accumulating said signal charge in said pixels;
   in a case where said second judgment process judges that said result of said first judgment process is correct, said panel unit continues said accumulation operation; and in a case where said second judgment process judges that said result of said first judgment process is incorrect, said panel unit stops said accumulation operation, and said sampling cycle setting unit sets said sampling cycle at said first sampling cycle, and then said emission start judgment unit restarts said first judgment process.

3. The radiation image detecting device according to claim 2, wherein said sampling cycle setting unit can change at least one of said first sampling cycle and said second sampling cycle.

4. The radiation image detecting device according to claim 3 having a first mode and a second mode, wherein
in said first mode, said first sampling cycle and said second sampling cycle are equal; and
in said second mode, said second sampling cycle is longer than said first sampling cycle.

5. The radiation image detecting device according to claim 4, further comprising:
a mode setting unit for automatically putting said radiation image detecting device into one of said first mode and said second mode in accordance with an imaging condition.

6. The radiation image detecting device according to claim 2, wherein
said first judgment process judges that said radiation emission has been started, when said dose signal exceeds a predetermined first threshold value; and
said second judgment process judges that said result of said first judgment process is correct, when said dose signal exceeds a second threshold value set higher than said first threshold value.

7. The radiation image detecting device according to claim 6, wherein
said radiation detector produces electric charge in accordance with said radiation dose;
said dose sampling unit has an integrator for integrating said electric charge and outputting a voltage in accordance with an amount of said integrated electric charge;
said sampling cycle includes an electric charge integration time for said integrator to integrate said electric charge and a readout time for reading out said voltage outputted from said integrator; and
said sampling cycle setting unit elongates said second sampling cycle by elongating said electric charge integration time.

8. The radiation image detecting device according to claim 6, wherein said radiation detector is provided in said panel unit.

9. The radiation image detecting device according to claim 6, wherein said pixels of said panel unit include a plurality of normal pixels used for detecting a radiographic image, and a plurality of detection pixels used as said radiation detectors.

10. The radiation image detecting device according to claim 9, wherein in said panel unit, signal lines are laid out on a column-by-column basis of said pixels arranged in two dimensions, and said integrator is connected to each of said signal lines.

11. The radiation image detecting device according to claim 10, wherein
said normal pixel is connected to said signal line through a TFT for reading out said signal charge accumulated during said accumulation operation; and
said detection pixel is connected to said signal line through a TFT in a short state such that said electric charge always flows into said signal line.

12. The radiation image detecting device according to claim 11, wherein said integrator has a capacitor for accumulating said electric charge and a reset switch for shorting out said capacitor, and said reset switch is turned on and off in synchronization with said sampling.

13. The radiation image detecting device according to claim 12, wherein said first sampling cycle is shorter than said readout time of said image signal of one row.

14. An operating method of a radiation image detecting device including:
a panel unit having a two-dimensional array of pixels each for accumulating signal charge representing an image signal based on radiation emitted from a radiation source;
a radiation detector for detecting said radiation to judge a start of radiation emission;
a dose sampling unit for periodically sampling a dose signal representing a radiation dose per unit of time based on output of said radiation detector;
an emission start judgment unit for sequentially performing a first judgment process and a second judgment process, said first judgment process judging whether or not said radiation emission has been started based on a level of said dose signal, said second judgment process judging whether or not a result of said first judgment process is correct based on said level of said dose signal sampled by said dose sampling unit; and
a sampling cycle setting unit for setting a sampling cycle of said dose signal in said dose sampling unit;
said operating method comprising the steps of:
setting a first sampling cycle used in said first judgment process by said sampling cycle setting unit; and
setting a second sampling cycle used in said second judgment process longer than said first sampling cycle by said sampling cycle setting unit, so that a signal value of said dose signal obtained in one-time sampling in said second judgment process is higher than a signal value of said dose signal obtained in one-time sampling in said first judgment process.

* * * * *